Patented Apr. 22, 1941

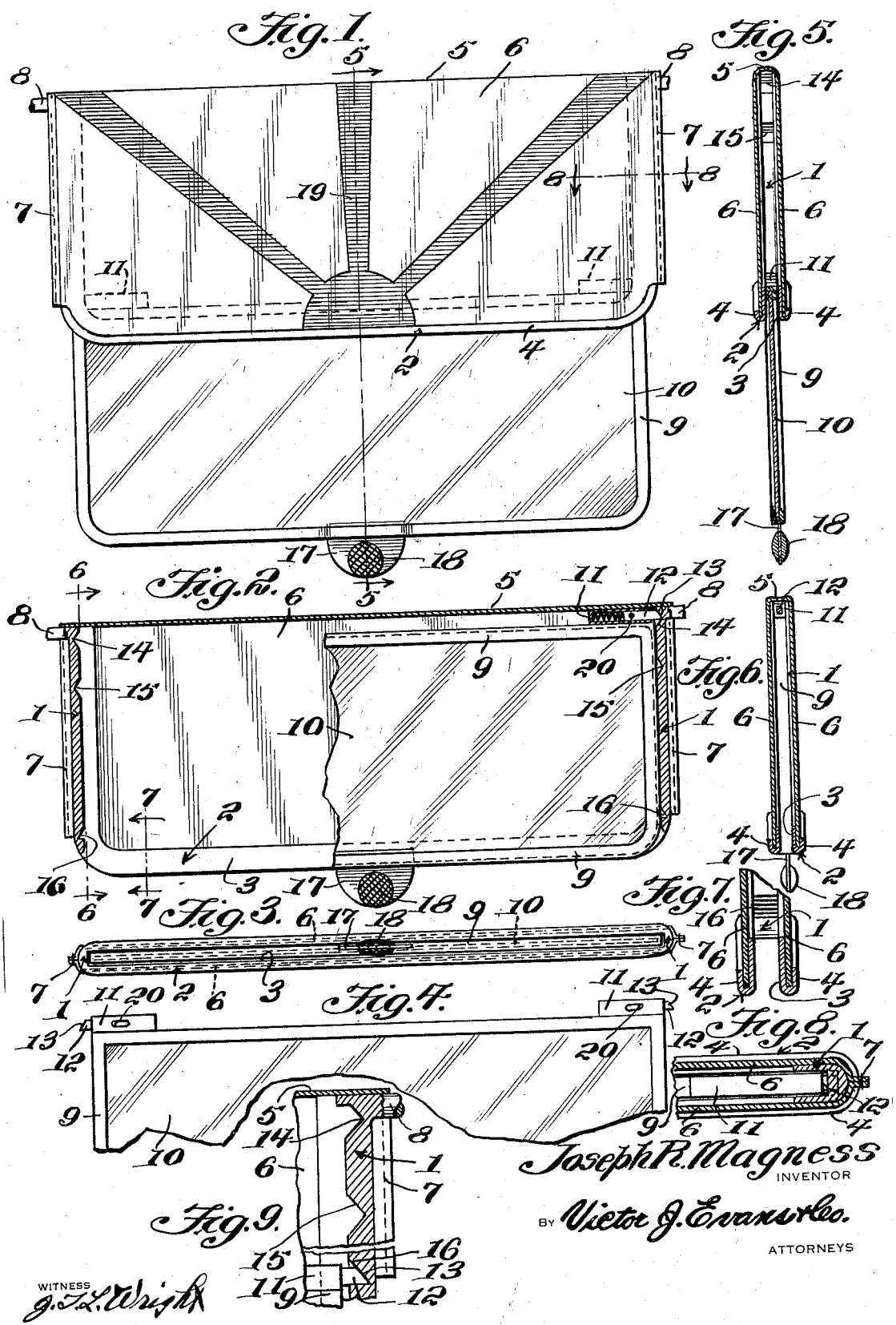

2,239,240

UNITED STATES PATENT OFFICE 2,239,240

MOTOR VEHICLE VISOR

Joseph R. Magness, Geary, Okla.

Application December 18, 1939, Serial No. 309,877

2 Claims. (Cl. 296—97)

This invention relates to sun visors for motor vehicles, and its general object is to provide a visor to be mounted within a vehicle for adjustment with respect to the windshield thereof, and which includes an opaque shield in the form of a sheath like housing having slidably mounted therein a translucent shield movable through the bottom of the opaque shield for disposal in the line of vision of the operator of the vehicle, to act as anti-glare means; thus it will be seen that my visor amply protects the operator against blinding light rays and allows clear and uninterrupted vision, regardless of the direction and intensity of the rays.

A further object is to provide a visor that includes cooperating opaque and translucent shields, and the translucent shield is held by automatic latching means, against casual movement wholly within the opaque shield when not in use or in several positions exteriorly thereof, and can be instantly moved to its respective positions merely by pulling or pushing the same.

Another object is to provide a visor of the character set forth that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a front view of my visor with the translucent shield disposed in its lowermost position for use.

Figure 2 is a front view with parts broken away and in section and illustrates the translucent shield wholly disposed within the opaque shield or out of use.

Figure 3 is a bottom plan view of the visor.

Figure 4 is a fragmentary view illustrating the upper portion of the translucent shield.

Figure 5 is a sectional view taken approximately on line 5—5 of Figure 1 looking in the direction of the arrows.

Figure 6 is a sectional view taken approximately on line 6—6 of Figure 2, looking in the direction of the arrows.

Figure 7 is a sectional view taken approximately on line 7—7 of Figure 2, looking in the direction of the arrows.

Figure 8 is a sectional view taken approximately on line 8—8 of Figure 1, looking in the direction of the arrows.

Figure 9 is an enlarged fragmentary sectional view taken through one end of the visor and illustrates the latching means for the translucent shield.

Referring to the drawing in detail, it will be noted that the opaque shield is of the usual elongated rectangular formation, but includes a body frame made up of parallel channeled end members 1 and a lower member 2, the latter merging into the end members to provide rounded corners, and is slotted longitudinally from adjacent its ends, as at 3.

The portions of the lower member 2 about the slot are outturned to form flanges 4 providing channels throughout the length of the lower member and within which are clamped the lower edges of a stiff covering of any suitable sheet material, such as leather or the like, folded longitudinally as at 5, about the upper ends of the end members to provide spaced housing walls 6 having the end edges thereof stitched together along the length of the end members 1 and exteriorly thereof, as at 7.

Formed on and extending outwardly from the upper end of the end members 1 are trunnions 8 to be mounted in suitable brackets secured within the body of a vehicle for adjustment of the device at various angles with respect to the windshield. By the structure mentioned it will be obvious that the opaque shield not only acts in the same capacity as a sun visor now in general use, but also as a sheath like housing for slidably receiving the translucent shield through the slot 3, to be guided within the channels of the end members, as best shown in Figure 8.

The translucent shield is made up of a rectangular frame 9 including upper, lower and end members which are of channel formation and have clamped therein a translucent sheet 10 of any suitable material such as glass, Celluloid or the like, and while the sheet 10 may be of any color, it is preferably green, but in any event is to act as an anti-glare means to protect the operator of the vehicle against blinding light rays, as will be apparent. The frame 9 is of a length and thickness to slidably fit between the end members 1 and the housing walls 6, and is of a width to be wholly disposed within the opaque shield, as shown in Figures 2 and 6.

In order to hold the translucent shield within the opaque shield and at various positions exteriorly thereof, I provide latching means which includes casings 11 that are of square cornered formation in cross section and fixed to the upper member of the frame 9 at the ends thereof, as best shown in Figure 4. Slidably mounted in the casings 11 for disposal through the outer open ends thereof, are spring pressed bolts 12 of the same cross sectional shape as that of the casings, to prevent rotation of the bolts 12 therein, as will be apparent, and the bolts 12 have beveled outer ends 13 for disposal in any one pair of companion notches providing keepers arranged in the confronting faces of the end members 1. The upper keeper notches, which are indicated by the reference numeral 14 and the intermediate keeper notches 15 are provided with diverging faces as best shown in Figure 9, so that the beveled outer ends 13 of the bolts 12 will freely and automatically move into and out of the same, but will remain therein until forced therefrom upon movement of the translucent shield. The lower keeper notches 16 are provided with upper beveled faces disposed at an acute angle to flat lower faces, so that the bolts 12 will also automatically move in and out of the notches 16, but the lower faces provide positive stops to prevent casual withdrawal of the translucent shield from the opaque shield.

Secured to and depending from the lower member of the frame 9 is a tab 17 of substantially semi-circular formation in the form as shown, and secured to the opposite faces of the tab are gripping disks 18 preferably formed from rubber or the like, to provide a positive gripping means, as will be apparent.

From the above description and disclosure in the drawing, it will be obvious that my visor in its entirety can be swung to various positions with respect to the windshield of the vehicle, due to the fact that the trunnions 8 are mounted in suitable brackets, for that purpose, as previously set forth, and that the translucent shield can be moved to and is held in several positions exteriorly of the opaque shield, as well as wholly within the latter, merely by pulling and pushing upon the tab.

The opaque shield may be decorated by a design 19 which is symbolical of the sun, and the bolts 12 may have pins 20 extending laterally therefrom and movable in slots extending longitudinally of the casings 11, to prevent removal of the bolts from the casings, in the event it should become necessary to separate the translucent shield from the opaque shield.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A motor vehicle visor comprising an opaque shield in the form of a flat housing having a slot therein, a body frame for the shield and including end members having end and intermediate keeper notches in the confronting faces thereof, a sheet of material secured to and covering the frame, a translucent shield fitting and mounted for slidable movement within the housing and through the slot, latching means carried by the translucent shield and including spring pressed bolts having beveled ends receivable in the keeper notches for holding the translucent shield in various positions into and out of use, a handle secured to and for moving the translucent shield to its respective positions, the notches being shaped to allow automatic movement of the bolts into and out of the notches upon movement of the translucent shield, and the outer notches having certain faces thereof arranged to provide stops for the bolts to prevent casual withdrawal of the translucent shield from the opaque shield.

2. A motor vehicle visor comprising an elongated rectangular opaque shield in the form of a flat housing to be mounted for adjustment from one longitudinal edge thereof and having a slot extending along its opposite longitudinal edge, a body frame for the shield and including end members having end and intermediate keeper notches in the confronting faces thereof, a sheet of material secured to and covering the frame, a translucent shield including a frame fitting and mounted for slidable movement within the housing and through the slot, a sheet of translucent material secured within the latter frame, latching means including square cornered casings secured along the inner longitudinal edge of the latter frame for disposal at the ends thereof, square cornered spring pressed bolts sildably mounted in the casings and having beveled ends receivable in the keeper notches for holding the translucent shield in various positions into and out of use, a handle secured to and for moving the translucent shield to its respective positions, the inner end and intermediate notches each having diverging faces and the outer end notches having beveled inner faces so that all of the notches allow automatic movement of the bolts into and out of the notches upon movement of the translucent shield, and the outer end notches having flat outer faces providing stops for the bolts to prevent casual withdrawal of the translucent shield from the opaque shield.

JOSEPH R. MAGNESS.